(12) United States Patent
Neuburger et al.

(10) Patent No.: US 6,660,120 B2
(45) Date of Patent: Dec. 9, 2003

(54) ADHESIVE TRANSFER DEVICE

(75) Inventors: Carl D. Neuburger, Scottsdale, AZ (US); Franklin C. Bradshaw, Scottsdale, AZ (US); Robert V. O'Keefe, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 4 days.

(21) Appl. No.: 10/051,150

(22) Filed: Jan. 22, 2002

(65) Prior Publication Data

US 2002/0102402 A1 Aug. 1, 2002

Related U.S. Application Data

(62) Division of application No. 09/343,676, filed on Jun. 30, 1999, now Pat. No. 6,403,185.
(60) Provisional application No. 60/095,210, filed on Aug. 3, 1998, provisional application No. 60/091,295, filed on Jun. 30, 1998, and provisional application No. 60/130,558, filed on Apr. 22, 1999.

(51) Int. Cl.[7] .............................. B44C 1/17; B44C 3/12; C09J 7/02; B32B 31/20; B32B 7/06
(52) U.S. Cl. ..................... 156/230; 156/234; 156/235; 156/239; 156/240; 156/247; 156/289; 427/146; 428/40.1; 428/41.8; 428/42.3; 428/195; 428/202; 428/352; 428/355 TS; 428/914
(58) Field of Search ................................. 156/250, 234, 156/63, 239, 240, 247, 289, 235, 297, 344; 427/146, 147; 428/40.1, 41.7, 41.8, 41.9, 42.2, 42.3, 195, 202, 203, 343, 352, 354, 355 RA, 914

(56) References Cited

U.S. PATENT DOCUMENTS

| | | |
|---|---|---|
| 2,528,395 A | 10/1950 | Slifkin |
| 2,607,711 A | 8/1952 | Hendricks |
| 2,652,351 A | 9/1953 | Gerhardt |
| 2,914,167 A | 11/1959 | Holtz |
| 3,285,771 A | 11/1966 | Dabroski |
| 3,359,107 A | 12/1967 | Goffe et al. |
| 3,394,799 A | 7/1968 | Ritson et al. |
| 3,464,842 A | 9/1969 | Jackstadt |
| 3,509,991 A | 5/1970 | Hurst |
| 3,671,236 A | 6/1972 | Van Beusekom |
| 3,928,690 A | 12/1975 | Settineri et al. |
| 4,331,727 A | 5/1982 | Maas |
| 4,543,139 A | 9/1985 | Freedman et al. |
| 4,629,634 A | 12/1986 | Coughlan et al. |
| 4,728,380 A | 3/1988 | Jones et al. |
| 4,759,816 A | 7/1988 | Kasper et al. |
| 4,859,512 A | 8/1989 | Jones et al. |
| 4,965,113 A | 10/1990 | Jones et al. |

(List continued on next page.)

FOREIGN PATENT DOCUMENTS

| | | |
|---|---|---|
| WO | WO 92/19447 | 11/1992 |
| WO | WO 96/08320 | 3/1996 |

*Primary Examiner*—J. A. Lorengo
(74) *Attorney, Agent, or Firm*—Pillsbury Winthrop LLP

(57) ABSTRACT

An adhesive transfer device and method for selectively making a repositionably adherable substrate from a selected substrate are disclosed. The device comprises a base substrate, a layer of repositionable adhesive disposed on the base substrate, a layer of permanent adhesive adjacent to the repositionable layer opposite the base substrate, and structure providing a release surface. The base substrate and the structure providing the release surface can be moved apart so as to leave both of the adhesive layers on the base substrate with the permanent layer exposed, thereby enabling the selected substrate to be adhered to the exposed permanent layer. The base substrate and the selected substrate can be moved apart from one another so as to separate the base substrate from the repositionable layer and leaving both the adhesive layers on the selected substrate with the repositionable layer exposed, thereby allowing the selected substrate to be repositionably adhered.

22 Claims, 14 Drawing Sheets

U.S. PATENT DOCUMENTS

| | | |
|---|---|---|
| 5,135,798 A | 8/1992 | Muschter et al. |
| 5,158,557 A | 10/1992 | Noreen et al. |
| 5,296,277 A | 3/1994 | Wilson et al. |
| 5,318,825 A | 6/1994 | Naber |
| 5,401,547 A | 3/1995 | Blackwell et al. |
| 5,558,913 A | 9/1996 | Sasaki et al. |
| 5,585,178 A | 12/1996 | Calhoun et al. |
| 5,665,446 A | 9/1997 | Sundet |
| 5,691,022 A | 11/1997 | Knauf |
| 5,705,243 A | 1/1998 | Mehta et al. |
| 5,735,998 A | 4/1998 | Bradshaw |
| 5,738,939 A | 4/1998 | Calhoun et al. |
| 5,788,796 A * | 8/1998 | Look et al. .......... 156/277 |
| 5,795,636 A | 8/1998 | Keller et al. |
| 5,876,817 A | 3/1999 | Mathna et al. |

\* cited by examiner

ADHESIVE TRANSFER DEVICE

The present application is a division of U.S. patent application Ser. No. 09/343,676, filed Jun. 30, 1999 now U.S. Pat. No. 6,403,195, which claims priority to U.S. Provisional Application of O'Keefe et al., Serial No. 60/095,210, filed Aug. 3, 1998, U.S. Provisional Application of Neuburger, Serial No. 60/091,295, filed Jun. 30, 1998, and U.S. Provisional Application of Neuburger et al., Serial No. 60/130,558, filed Apr. 22, 1999, each of which applications are hereby incorporated in their entirety into the present application by reference.

FIELD OF THE INVENTION

The present invention relates to an adhesive transfer device for making repositionably adherable substrates.

BACKGROUND OF THE INVENTION

Uses for labels, stickers, and other adherable substrates can be found in almost every aspect of life—school projects, professional presentations, file labels, CDs and tapes, computer disks, containers for food in the freezer, etc. Traditionally, such adherable substrates used permanent pressure-sensitive adhesives which made the labels difficult to remove without the assistance of a solvent. This situation can oftentimes be problematic because the label can tear, leaving label remnants behind on the surface to which it was adhered and rendering the label useless.

For example, consider a person putting together a professional presentation. Many such presentations involve positioning items such as charts and photographs onto a large posterboard. One device which can be used to perform this task is shown in U.S. Pat. No. 4,331,727. The device of the '727 patent is a roll of release-coated substrate coated on one side with pressure-sensitive permanent adhesive. The user unrolls the substrate, then takes an item, such as the photograph or chart, and presses it against the unrolled substrate to transfer the adhesive to the item. The item can now be adhesively bonded to the posterboard.

The problem with this type of device is that the adhered item cannot be easily removed from the posterboard and repositioned without damaging the board and the adhered item. Thus, hours of hard work could be wasted simply by permanently adhering the wrong chart to the wrong board or in the wrong place on the right board. It can be appreciated that similar problems arise in the fields of arts and crafts, school projects, and other areas.

Another example of this type of problem is found in adherable window signs. Many stores and restaurants use signs advertising sales, new items, holiday themes, etc. which are adherably bonded to the inner surface of a window with a permanent pressure sensitive adhesive. When the proprietor desires to remove the sign, he or she must typically use a solvent and a scraper to remove the sign. Misuse of the scraper can damage the window and almost always destroys the sign itself.

Removable or repositionable adhesives can obviate the problems associated with the permanent nature of permanent adhesives. Conventionally, in order to create a substrate which adheres to a contact surface in a removable or repositionable manner, the substrate is coated with a primer and then the primed area is coated with a commercially available liquid repositionable adhesive or a relatively solid "glue-stick" of such adhesive. This process can become somewhat messy due to the potential for spilling either the liquid adhesive or the primer. Also, the adhesives sometimes are available in a spray form which can be difficult to apply evenly over a substrate surface. Certain spots on the substrate can also be overlooked or missed during manual application of the primer and adhesive. Furthermore, it is undesirable to purchase a bottle of primer and a bottle of liquid repositionable adhesive or a glue-stick if these materials are only to be used for a limited number of applications.

U.S. Pat. No. 5,558,913 discloses a primerless adhesive construction comprising a backing, a layer of permanent adhesive, a layer of removable adhesive, and a release liner. The permanent adhesive layer bonds the removable layer to the backing, thereby allowing the backing to be removably adhered to a contact surface. The ratio of removable adhesive to permanent adhesive is greater than 1:1 and the density of both adhesive layers combined is in the range of 18–25 grams per square meter. The subject matter of the '913 patent, however, does not address the problems discussed above.

The '913 patent discloses the permanent layer as being bonded to the backing and is mainly concerned with pre-made labels and stickers of predetermined size, such as mailing labels and file folder labels. The subject matter disclosed in the '913 patent, however, cannot be used to make preexisting non-adherable substrates, such as photographs, charts, and window signs, into repositionably adherable substrates.

Consequently, there exists a need for an adhesive transfer device which can be used to create repositionably adherable substrates of different types and sizes for a wide variety of applications.

It is therefore an objective of the present invention to meet the above-described need. In order to achieve this objective, the present invention provides an adhesive transfer device for selectively making a repositionably adherable substrate from a selected substrate. The device comprises a base substrate and a layer of pressure-sensitive repositionable adhesive disposed on a portion of the base substrate. A layer of pressure-sensitive permanent adhesive is disposed adjacent to the repositionable adhesive layer opposite the base substrate portion.

A release surface removably engages the permanent adhesive layer opposite the repositionable adhesive layer and the base substrate portion. The nature of the release surface is such that the base substrate and the structure providing the release surface can be moved apart from one another so as to separate the release surface from the permanent adhesive layer and leave the adhesive layers on the base substrate with the permanent adhesive layer exposed, thereby enabling the exposed permanent adhesive layer to be adhesively bonded to the selected substrate by engaging the selected substrate with permanent adhesive layer. The adhesive layers are provided such that the base substrate and the selected substrate can be moved apart from one another so as to separate the base substrate from the repositionable adhesive layer and leave both the adhesive layers on the selected substrate with the repositionable adhesive layer exposed, thereby allowing the selected substrate to be (a) repositionably adhered to a contact surface by engaging the exposed repositionable adhesive layer with the contact surface and applying pressure to the selected substrate and (b) thereafter be removed from the contact surface and repositionably adhesively bonded to another contact surface.

It is preferred that the nature and the thickness of the permanent adhesive layer be sufficient to bond to textured surfaces such as cloth, carpeting, and the like. When relatively low amounts of adhesives are used the permanent layer is capable of adhering to smooth surfaces such as glass and paper, but has difficulty in bonding to textured surfaces such as cloth. The adhesive layers disclosed in the '913 patent are sufficient only for bonding with a clean, smooth backing, such as the pre-fabricated backing provided during assembly of the label. In contrast, the preferred thickness and nature of the permanent layer according to the present invention allows the adhesive layers to bond to a wide variety of materials, including both clean, smooth surfaces and uneven, textured surfaces.

Preferably, the weight ratio of repositionable adhesive to permanent adhesive is greater than 1:1. This ratio is preferred to ensure that the permanent adhesive does not mix with and overcome the repositionable adhesive to thereby cause the latter to lose its repositionable characteristics. However, this ratio is not critical to the present invention.

The preferred type of adhesive for the repositionable adhesive is a microsphere adhesive. Microsphere adhesives exhibit superior bonding characteristics for a wide range of surfaces. In addition, microsphere adhesives provide excellent control over the bond strength and characteristics. The preferred type of adhesive for the permanent adhesive is an acrylic emulsion based adhesive.

The broad principles of the present invention may be practiced in a variety of ways. The present application discloses a variety of exemplary devices which utilize the principles of the present invention, including adhesive transfer sheets, an adhesive transfer cartridge to be used in conjunction with an adhesive transfer apparatus, and a substrate dispenser for dispensing a substrate coated with adhesive materials. The principles of the present invention, however, are not limited to these exemplary devices.

Other objects, features, and advantages of the present invention can be appreciated from the following detailed description, the accompanying drawings, and the appended claims.

DETAILED DESCRIPTION OF THE PREFERRED EMBODIMENTS OF THE INVENTION

Figure 1:
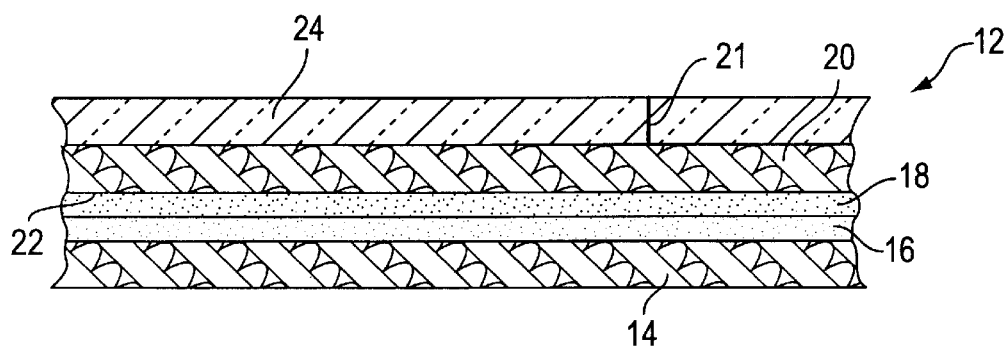
FIG. 1 is a cross-sectional view of an individual adhesive transfer sheet designed in accordance with the principles of the present invention.
Figure 2:
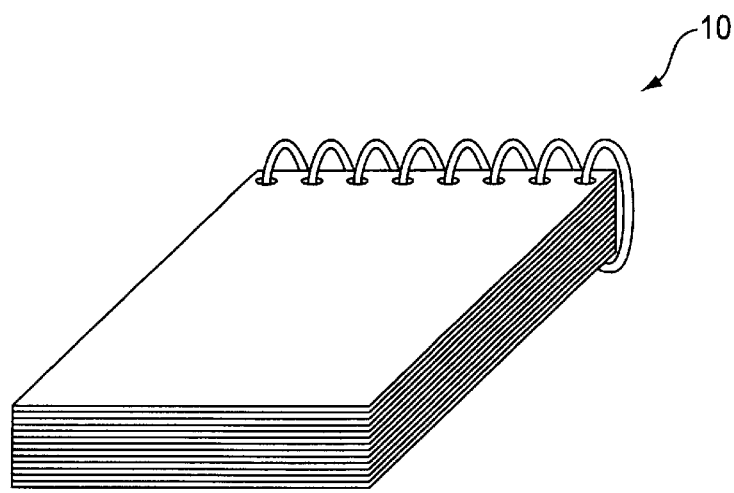
FIG. 2 is a perspective view of an adhesive transfer tablet comprising a plurality of the individual adhesive transfer sheets shown in FIG. 1.

FIGS. 1–5 illustrate an adhesive transfer device in the form of a adhesive transfer tablet, generally indicated 10, embodying the principles of the present invention. FIG. 2 shows a perspective view of the tablet 10. The tablet 10 includes a plurality of individual adhesive transfer sheets, generally indicated at 12, bound together in a conventional fashion. Such binding may include a spiral binding, adhesive binding, or any other arrangement by which a plurality of individual sheets can be bound together.

FIG. 1 illustrates a cross-section of an individual adhesive transfer sheet 12. The scaling of the cross-sectional view is exaggerated in order to more clearly illustrate the principles of the present invention. The sheet 12 comprises a base substrate 14, which may be paper, a plastic sheet, or any other suitable material. The base substrate 14 is coated with a layer of pressure-sensitive repositionable adhesive 16. The layer of repositionable adhesive 16 is an adhesive which does not set or take a permanent adhesive bond over time and may be referred to as reversible because it can be removed from surfaces. One such repositionable adhesive is formed from pressure-sensitive adhesive microspheres. However, any suitable repositionable adhesive may be used to form the repositionable adhesive layer 16.

A layer of pressure-sensitive permanent adhesive 18 is bonded to the repositionable adhesive layer 16 so that the entire layer 16 is covered. The layer of permanent adhesive 18 is formed from a suitable adhesive which has relatively strong and durable bonding qualities suitable for extended periods of use. It is to be understood that such a suitable adhesive may include an acrylic emulsion adhesive, a rubber-based adhesive, or any other suitable material exhibiting such durable bonding qualities. Also, it is to be understood that the bonding between the permanent and repositionable adhesive layer 16, 18 does not have to be direct as shown and instead an intervening layer may optionally be provided.

A release liner 20 removably covers the layer of permanent adhesive 18. The release liner 20 may be a regular release liner or a differential release liner. A regular release liner has both sides thereof treated with a low friction material, such as silicone or the like, so as to have a low affinity for allowing adhesives to bond thereto; a differential release liner has only one side thereof treated in such a manner. Typically, either type of release liner may be constructed from paper or a synthetic material. Regardless of whether the release liner 20 is of the differential or regular type at least, the release surface 22 of the release liner 20 engaging the permanent adhesive layer 18 is provided with a relatively poor affinity for bonding with adhesives. The nature of the release surface is such that the base substrate 14 can be moved away from the release surface 22 without stripping the adhesive layers 16, 18 from the base substrate 14 so as to leave the adhesive layers 16,18 on the base substrate 14 with the permanent layer 18 exposed. In other words, the release surface 22 allows the release liner 20 to be disposed in covering relation over the permanent adhesive layer 18 to protect the adhesive layers 16, 18 from exposure, yet be easily removed from the adhesive transfer sheet 12 without removing the adhesive layers 16,18 from the base substrate 14. A transversely extending score line 21 may be provided to facilitate removal of the release liner 20.

Finally, an adhesive mask in the form of a transparent plastic sheet 24 is disposed over the release liner 20. The transparent plastic sheet 24 has relatively better adhesive bonding characteristics in comparison to the release liner 20. In particular, the desirable adhesive bonding qualities of the transparent plastic sheet 24 are such that, when the release liner 20 is moved out of covering relation with respect to the layer of permanent adhesive 18 and separated from the adhesive transfer sheet 12, the plastic sheet 24 can be moved into direct contact with the permanent adhesive layer 18 so as to cover the entire layer 18. The layer of permanent adhesive 18 will bond to the sheet 24. Manual pressure may be applied to the sheet 24 in order to enhance such bonding. The plastic sheet 24 may then be peeled back so as to remove both layers of adhesive 16, 18 from the base substrate 14.

It is within the scope of the present invention to use any other material (e.g. paper, fabric, etc.) to which the layer of permanent adhesive material 18 will adhere in place of the plastic sheet 24. The transparent plastic sheet 24 is preferable simply so that a user may view the selected substrate or master 26 through the sheet during the adhesive transfer operation.

It is to be understood that the layers of adhesive 16,18 may be formed by any suitable process. In one such process, the layer of pressure-sensitive permanent adhesive 18 is coated on the release surface 22 of the release liner 20 and the layer of repositionable adhesive 16 is coated on the base substrate 14. The base substrate 14 and the release liner 20 are then put together so as to bring the layer of permanent adhesive 18 into contact with the layer of repositionable adhesive 16. In another such process, the layer of repositionable adhesive 16 is coated on the base substrate 14 and then the layer of permanent adhesive 18 is coated on the layer of repositionable adhesive 16. The release liner 20 is then disposed on the layer of permanent adhesive material 18 so as to cover the entire layer 16. This second method may be performed by a conventional curtain coating operation as disclosed in U.S. Pat. No. 5,558,913, the entirety of which in incorporated into the present application by reference.

An adhesive transfer sheet 12 designed in accordance with the principles of the present invention may be used to perform an adhesive transfer operation on the selected substrate 26. In the figures, the substrate 26 illustrated is simply a blank paper card. However, it is contemplated that a wide variety of selected substrates may be used with the adhesive transfer sheets of the present invention. For example, it may be desirable to perform an adhesive transfer operation on business cards, office supplies, holiday decorations, school projects, arts and crafts projects, etc.

Figure 3:
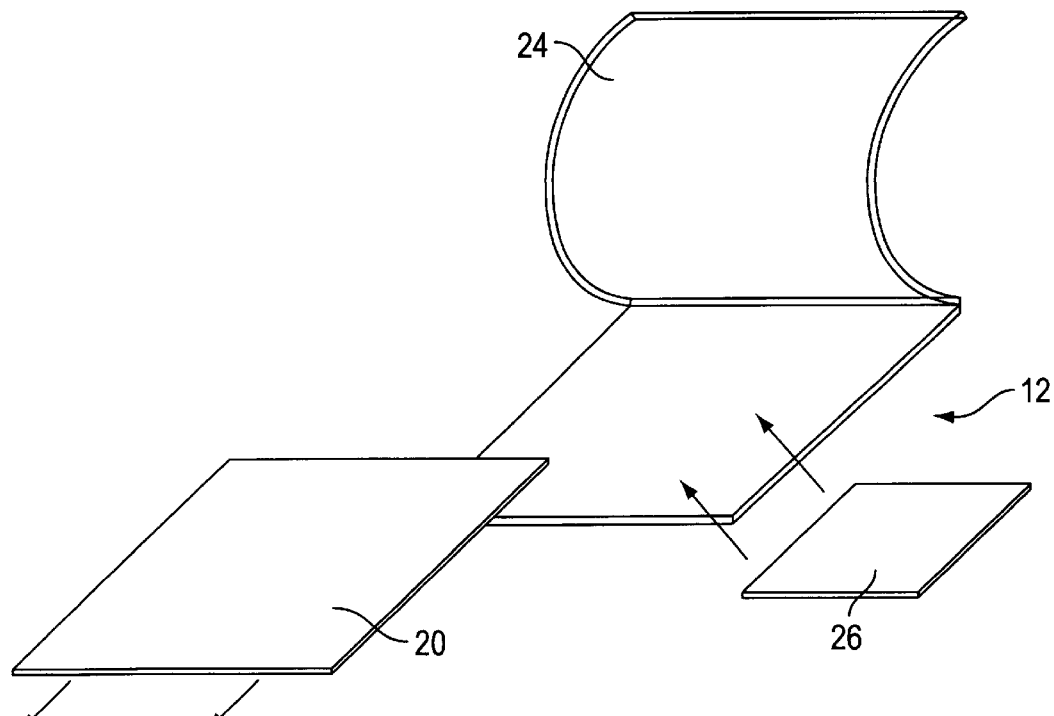
FIG. 3 is a perspective view of the individual adhesive transfer sheet of FIG. 1 with an adhesive mask in the form of a transparent plastic sheet peeled back and the release liner thereof being removed.

To perform an adhesive transfer operation utilizing the adhesive transfer sheet 12 of the present invention, the transparent plastic sheet 24 is first peeled back away from the release liner 20, as shown in FIG. 3, and the release liner 20 is then moved out of covering relation with respect to the layer of permanent adhesive 18 so as to expose the layer 18. The adhesive layers 16, 18 remain on the base substrate 14 as the release liner 20 is moved out of covering relation as a result of both the bond between the layers 16, 18 and the bond between the repositionable adhesive 16 and the base substrate 14 being stronger than any bond which may have been present between the permanent adhesive layer 18 and the release surface 22.

Figure 4:
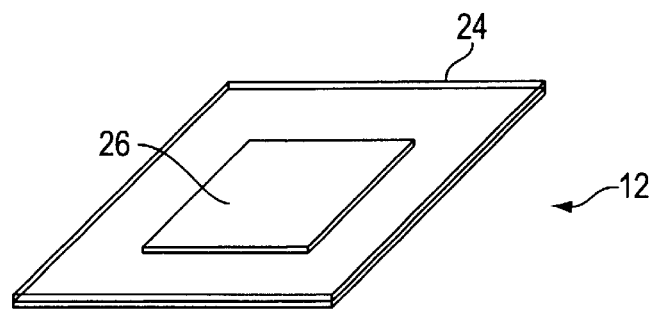
FIG. 4 is a perspective view of the individual adhesive transfer sheet of FIG. 1 with a master positioned thereon for an adhesive transfer operation and the transparent plastic sheet moved back into covering relation.

The surface of the selected substrate 26 is then engaged with the permanent adhesive layer 18 and the transparent plastic sheet 24 is moved into covering relation over both the selected substrate 26 and the permanent adhesive layer 18 (FIG. 4). Pressure is then applied to the portion of the sheet 24 covering the selected substrate to ensure that the permanent adhesive 18 is adequately bonded to the substrate 26.

Figure 5:
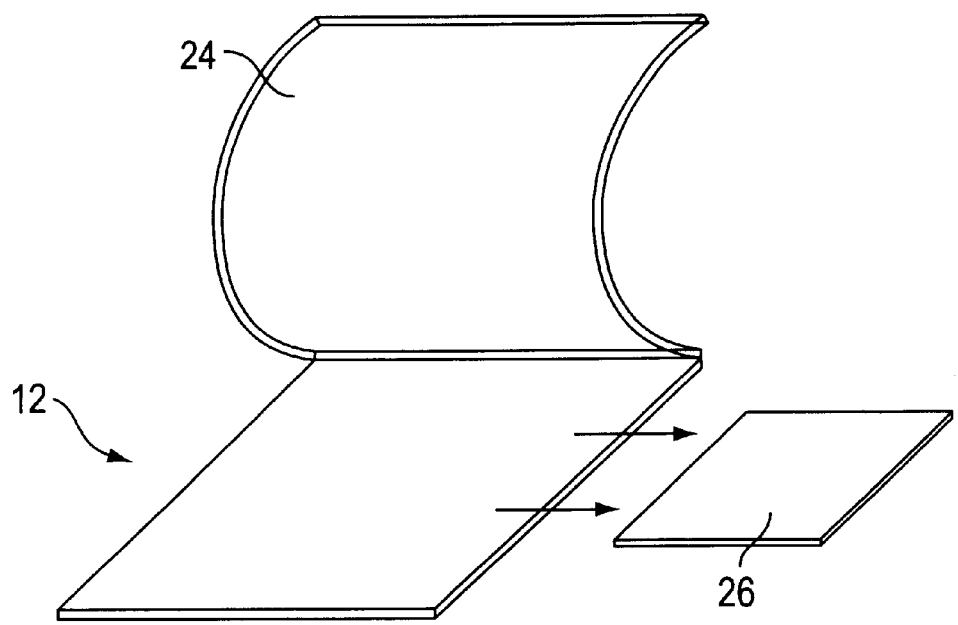
FIG. 5 is a perspective view of the individual adhesive transfer sheet of FIG. 1 with transparent plastic sheet peeled back out of covering relation and the master removed after the adhesive transfer operation has been performed.

The next step is to peel the transparent plastic sheet 24 back away from the selected substrate 26 and the permanent adhesive layer 18 (FIG. 5). As the transparent plastic sheet 24 is peeled back, the portions of the permanent adhesive layer 18 not covered by the selected substrate master 26 adhere to the plastic sheet 24 and are removed or "stripped" away from the base substrate 14 along with the portions of the repositionable adhesive layer 16 not covered by the substrate 26. The transparent plastic sheet 24 is then discarded along with the stripped portion of the permanent and repositionable adhesive layers 16,18 adhered thereto. Finally, the selected substrate 26 is then removed from the base substrate 14. The bond between the adhesive layers 16,18 is such that the base substrate 14 can be moved relatively away from the selected substrate 26 so as to leave both adhesive layers 16, 18 on the selected substrate 26 with the repositionable adhesive layer 16 exposed. The selected substrate 26 may then be repositionably adhered to desired contact surfaces by engaging the exposed repositionable adhesive 16 with the contact surface and then be removed and repositioned so as to be removably adhered to other desired contact surfaces a number of times.

The use of an adhesive mask (i.e., plastic sheet 24) is particularly advantageous in that it 'strips' away all of the adhesive material from the base substrate 14. The mask can then be crumpled up and discarded without unnecessarily getting adhesive material on the hands of the user. This 'stripping' feature enhances the adhesive transfer process and makes it an easy, clean, and simplified operation.

Figure 6:
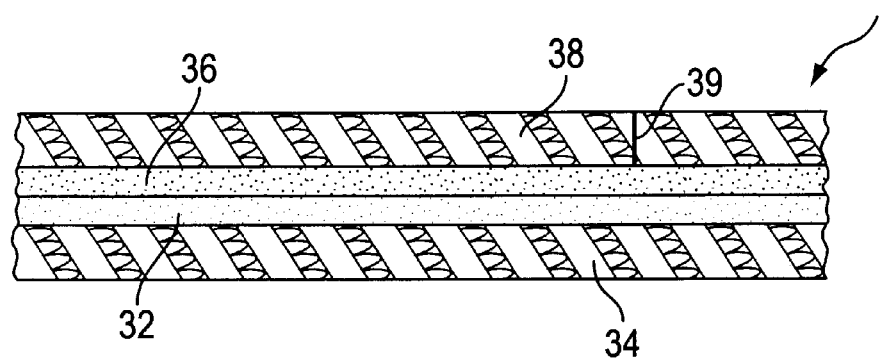
FIG. 6 is a cross-sectional view of a second embodiment of an adhesive transfer sheet designed in accordance with the principles of the present invention.

FIG. 6 shows a second embodiment of an adhesive transfer sheet 30 embodying the principles of the present invention. The sheet 30 of the second embodiment is similar to the sheet 12 of the first embodiment in all respects except that no mask is provided. The sheet has a base substrate 34, a layer of pressure-sensitive repositionable adhesive 32 disposed on the base substrate 34, a layer of pressure-sensitive permanent adhesive 36 bonded to and covering the repositionable adhesive layer 32, and a release liner 38 (with score line 39) covering the permanent adhesive layer 36 opposite the repositionable adhesive layer 32. To selectively make a repositionably adherable substrate from a selected substrate, the release liner 38 is moved away from the base substrate 34 so as to leave the adhesive layers 32, 36 on the base substrate 34 with the permanent adhesive layer 36 exposed. The exposed permanent adhesive layer 36 is then adhesively bonded with the selected substrate. The base substrate 34 is then moved away from the selected substrate (or the selected substrate is moved away from the base substrate 34) so as to leave the permanent adhesive layer 36 adhesively bonded to the selected substrate with the repositionable adhesive layer 32 bonded to the permanent adhesive layer 36 and exposed. Finally, the selected substrate is repositionably adhered to a contact surface by engaging the exposed repositionable adhesive layer 32 therewith.

Figure 7:
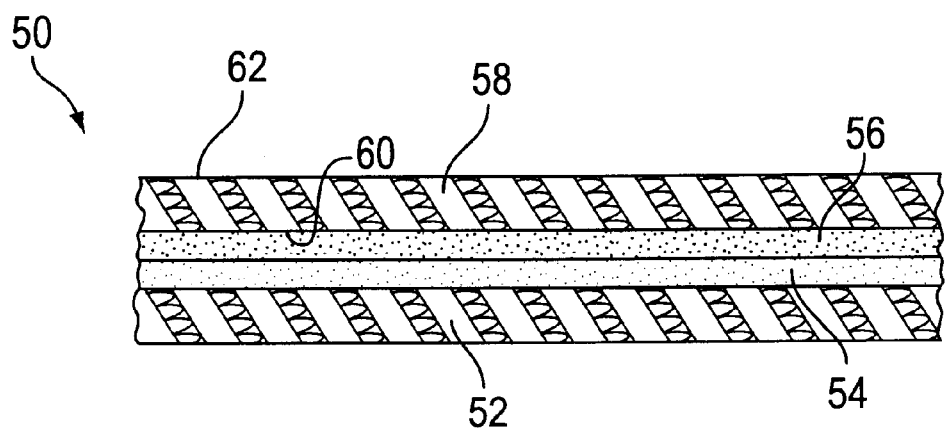
FIG. 7 is a cross-sectional view of a third embodiment of an adhesive transfer sheet designed in accordance with the principles of the present invention.

FIG. 7 shows yet another embodiment of an adhesive transfer sheet 50. The sheet 50 of FIG. 7 has a base substrate 52, a layer of pressure-sensitive repositionable adhesive 54, coated on the base substrate 52, and a layer of pressure-sensitive permanent adhesive 56 coated over and bonded to the layer of repositionable adhesive 52. A single release liner/adhesive mask substrate 58 is engaged with and positioned in covering relation over the permanent adhesive layer 56. Substrate 58 has two opposing surfaces, a release surface 60 and a stripping surface 62. Normally, before the sheet 50 has been used, the release surface 60 is engaged with the permanent adhesive layer 56. The release surface 60 is treated with a low friction material, such as silicone or the like, to provide it with a low affinity for adhesive bonding in a manner similar to the release surface 22 discussed with respect to the embodiment of FIGS. 1–5. In contrast, the stripping surface 62 has a relatively high affinity for adhesive bonding in comparison to release surface 60. Preferably, the substrate 58 is made from paper or a synthetic material to which the permanent adhesive layer 56 will adhere and the stripping surface 62 is left uncoated so that the permanent adhesive layer 56 bonds thereto.

To perform the adhesive transfer operation with sheet 50, the release liner/adhesive mask substrate 58 is pulled back so as to move the release surface 60 out of engagement with the permanent adhesive layer 56. Because the bond between the adhesive layers 54, 56 and the bond between the repositionable layer 54 and the base substrate 52 are both stronger than any bond that may have existed between the permanent adhesive layer 56 and the release surface 60, both the layers 54, 56 will remain on the base substrate 52. Then, the selected substrate can be engaged with the permanent adhesive layer 56. The substrate 58 can then be flipped over and placed over the selected substrate so that the stripping surface 62 thereof engages and covers the selected substrate and the portions of the permanent adhesive layer 56 exposed around the periphery of the selected substrate. Pressure may then be applied to substrate 58 to ensure that the permanent adhesive layer 56 adhesively bonds to the selected substrate and the stripping surface 62.

Next, the release liner/adhesive mask substrate 58 can be pulled back away from the base substrate 52 so as to strip all the portions of the adhesive layers 54, 56 not covered by the selected substrate away from the base substrate 52. The release liner/adhesive mask substrate 58 can then be discarded with the stripped away adhesive thereon. The selected substrate can then be peeled back from the base substrate 52, with the permanent adhesive layer 56 remaining bonded to the selected substrate and the repositionable adhesive layer 54 remaining bonded to the permanent adhesive layer 56 so that the repositionable adhesive layer 54 is exposed and ready to be repositionably adhered to a surface. The advantage of this embodiment of the invention is that the function of a release liner and an adhesive mask are combined into a single substrate, thereby reducing the overall cost of the sheet 50.

These individual adhesive transfer sheets 12 designed in accordance with the principles of the present invention offer a quick, easy, and inexpensive means for performing an adhesive transfer operation to create a repositionably adhesive substrate. These individual sheets can be produced relatively inexpensively and sold either individually or in varying quantities (i.e., tablets of 10, 25, 50, etc.) to meet the needs of various users. Such tablets offer an inexpensive option to purchasing an adhesive transfer machine for those who only desire to perform a limited number of adhesive transfer operations. These tablets also offer a cleaner and easier option to using liquid adhesive materials, adhesive tape, glue sticks, etc. in order to create homemade repositionable substrates.

Figure 8:
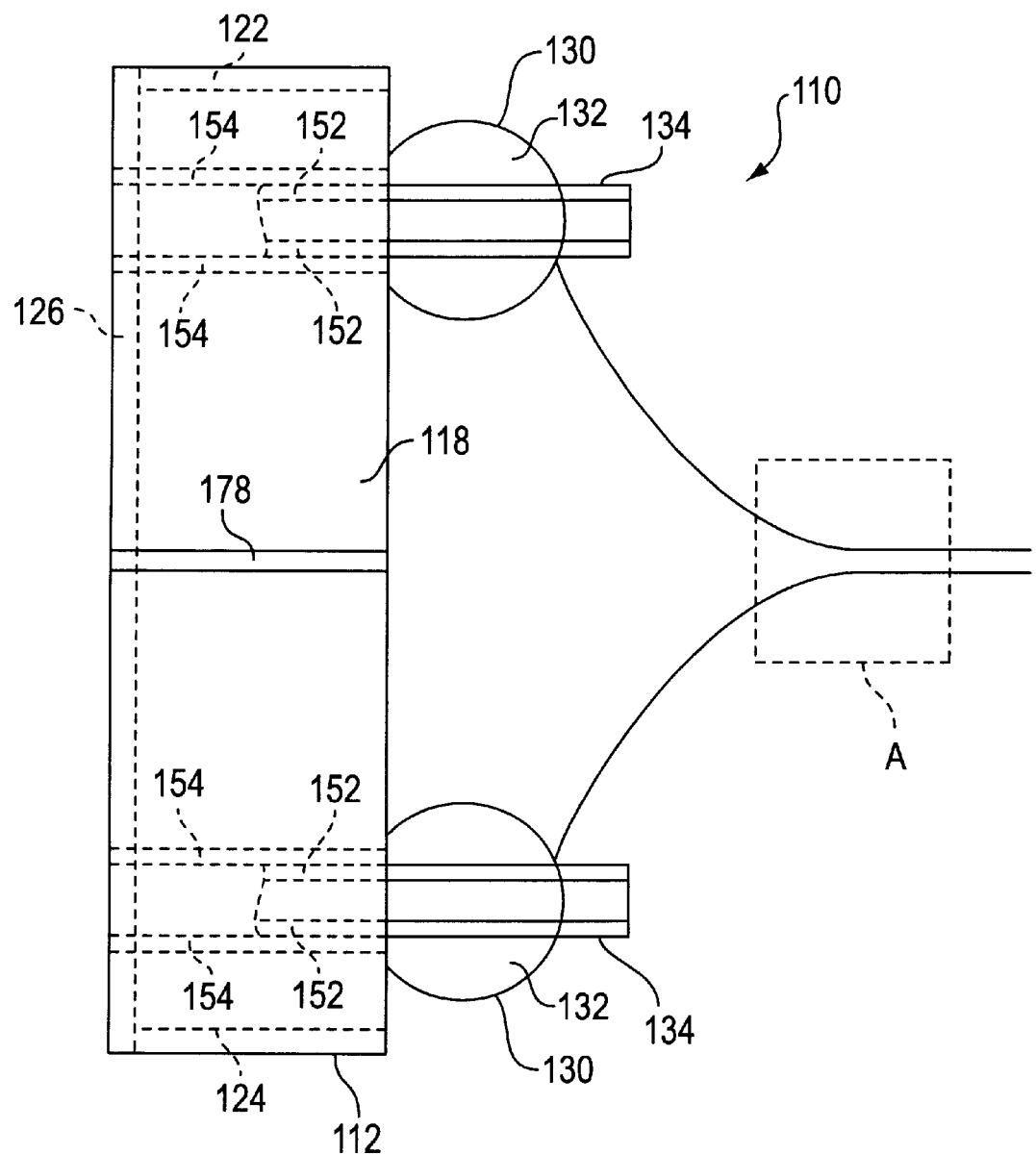
FIG. 8 is a side view of an adhesive transfer cartridge embodying the principles of the present invention.
Figure 9:
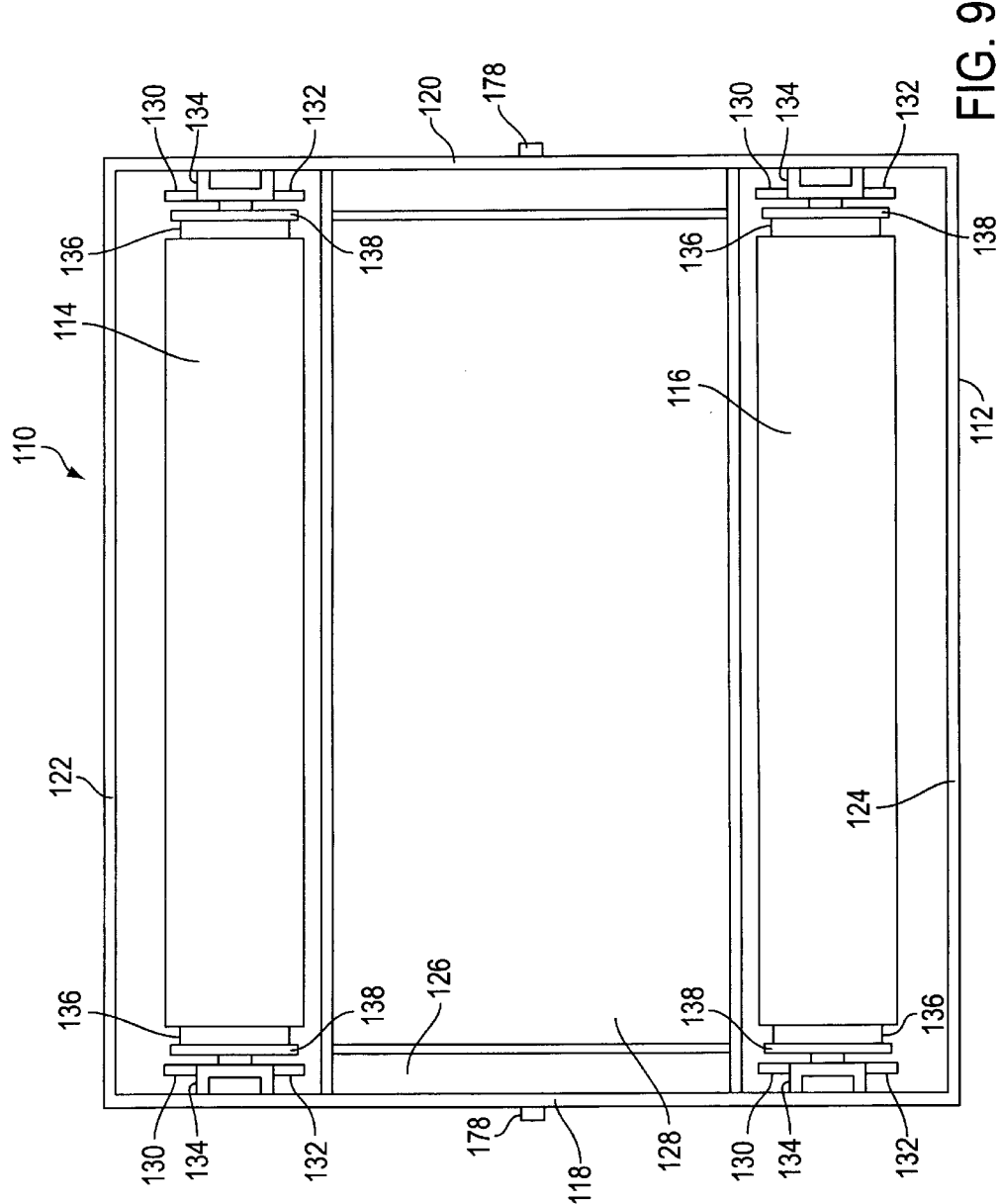
FIG. 9 is a front view of the adhesive transfer cartridge of FIG. 8.

FIG. 8 shows a removable adhesive transfer cartridge, generally indicated at 110, constructed in accordance with the principles of the present invention. The cartridge 110 may be used in conjunction with any of the adhesive transfer and laminating machines disclosed in U.S. Pat. Nos. 5,584,962 and 5,580,417, and U.S. patent application of Paque, Ser. No. 09/189,273, the entirety of each being incorporated into the present application by reference.

The cartridge 110 comprises a cartridge body structure 112, an upper supply roll 114, and a lower supply roll 116. The upper and lower supply rolls 114, 116 are rotatably mounted to the cartridge body structure 112 and extend transversely between the opposing side walls 118, 120. As will be noted from FIG. 8, the axes of the supply rolls 114, 116 are located slightly outside of the interior of the cartridge body structure 12. However, the supply rolls 114, 116 may be located fully interiorly 114, 116 of the body structure 112. An upper wall 122 and a lower wall 124 extend transversely between the opposing sidewalls 118, 120. A rear wall 126 extends between the upper and lower walls 122, 124 and transversely between the side walls 118, 120. The rear wall 126 has a substrate feeding opening 128 formed therethrough, which will be discussed below in further detail.

Two pairs of supply roll mounting structures 130 rotatably mount the supply rolls 114, 116 to the cartridge body structure 112. Each of the mounting structures 130 includes a generally circular protective structure 132 and a cartridge body attaching structure 134. The generally circular protective structures 132 serve to cover the axially facing sides of the supply rolls 114, 116 so as to protect them from being damaged and to keep debris from coming into contact with the adhesive material which is disposed on the supply rolls 114, 116.

Figure 11:
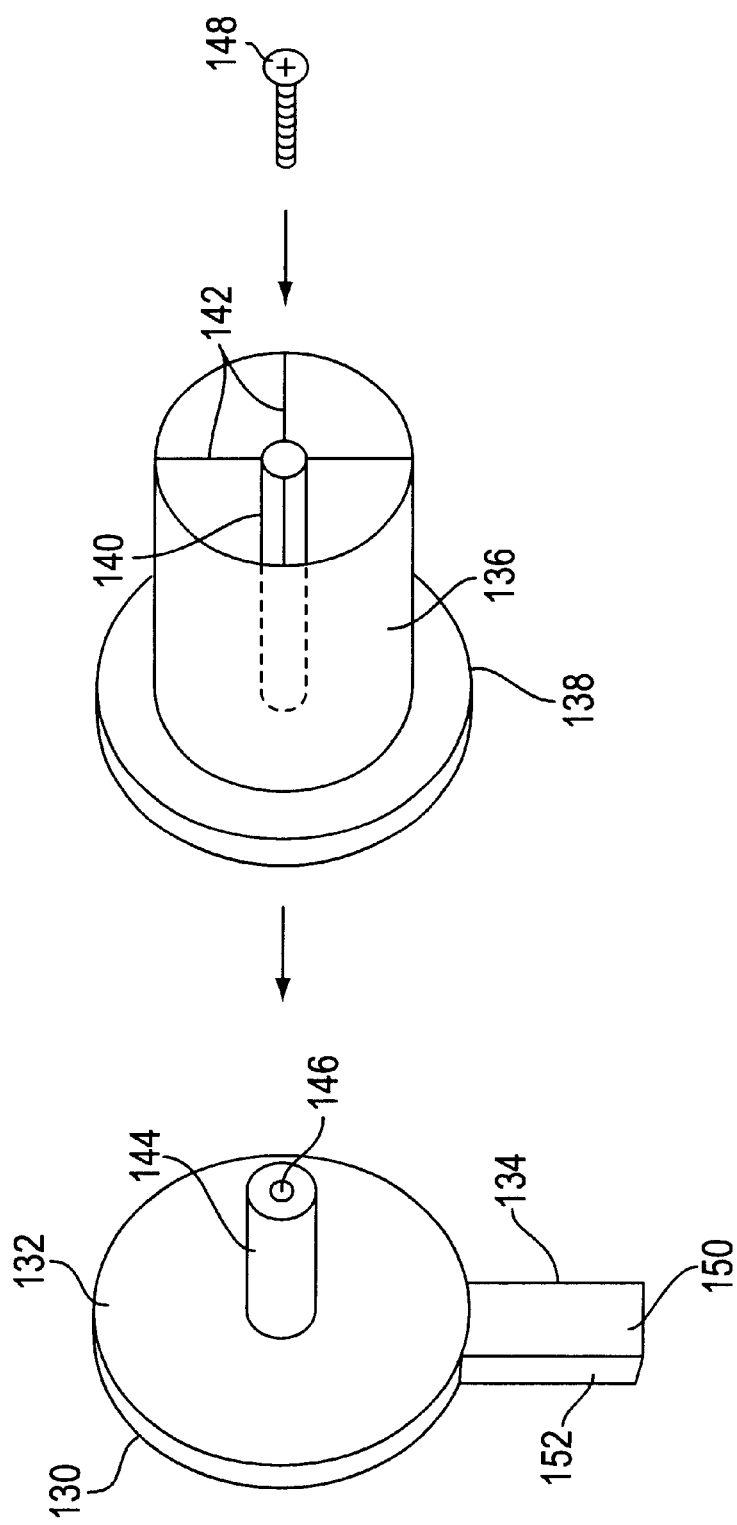
FIG. 11 is an exploded view of the components located at an end of a supply roll in the adhesive transfer cartridge of FIG. 8.

As seen best in FIG. 11, a generally cylindrical roll attaching structure 136 is provided with a radially extending outer plate member 138. The roll attaching structure 136 is configured to be received within the interior of a supply roll 114, 116 and is preferably fixed therein by means of an adhesive. The roll attaching structure 136 also includes an axially extending sleeve member 140 and four radially extending portions 142 which provide support to the roll attaching structure 136. The sleeve member 140 extends along the central axis of the roll attaching structure 136 and is configured to rotatably receive a generally cylindrical shaft member 144. A threaded fastener-receiving bore 146 is formed within the shaft member 144. A fastener 148 in the form of a screw is configured to be received within the fastener-receiving bore 146 in order rotatably mount the roll attaching structure 136 (and hence the supply roll 114, 116) to the shaft member 144. The screw 148 is tightened to tightly engage the axial surfaces of protective structure 132 and plate member 138 so that friction is created during unrolling of the feed rolls. This friction brakes or pretensions the rolls and prevents overrunning of the would substrates during operation. The braking assembly of U.S. Provisional Appln. of Borgeson, Serial No. 60/101,366, the entirety of which is incorporated into the present application, may alternatively be used to brake or tension the feed rolls.

The cartridge body attaching structures 134 comprise a planar base member 150 and a pair of generally parallel outwardly extending attaching portions 152. The cartridge body structure 112 has four pairs of generally parallel inwardly extending attaching portions 154 located at the points where the supply rolls 114, 116 are to be mounted. The width between the interior surfaces of the generally parallel inwardly extending portions 154 is substantially the same as the width between the exterior surfaces of the generally parallel outwardly extending portions 152. These widths allow the generally parallel outwardly extending attaching portions 152 to be slid in between the parallel inwardly extending portions 154 (as shown in FIG. 11) and fixedly attached thereto by suitable means such as an adhesive or mechanical fasteners to thereby fixedly mount the supply roll mounting structures 130 to the cartridge body structure 112. Each attaching portion 152 has a stepped shoulder portion 156 which engages the associated side wall 118, 120 to thereby determine the depth to which the outwardly extending attaching portions 152 can be slid into the inwardly extending attaching portions 154.

Figure 12:
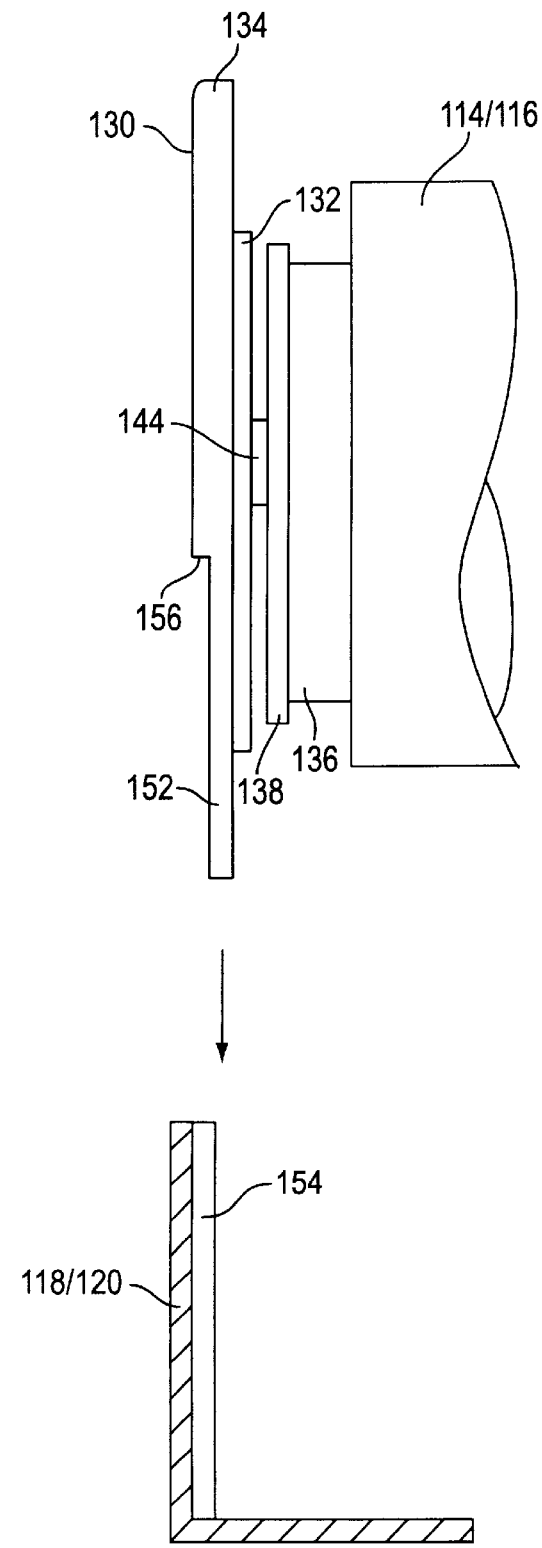
FIG. 12 is cross-sectional view illustrating how the supply roll is mounted within the cartridge body structure of the adhesive transfer cartridge of FIG. 8.
Figure 13:
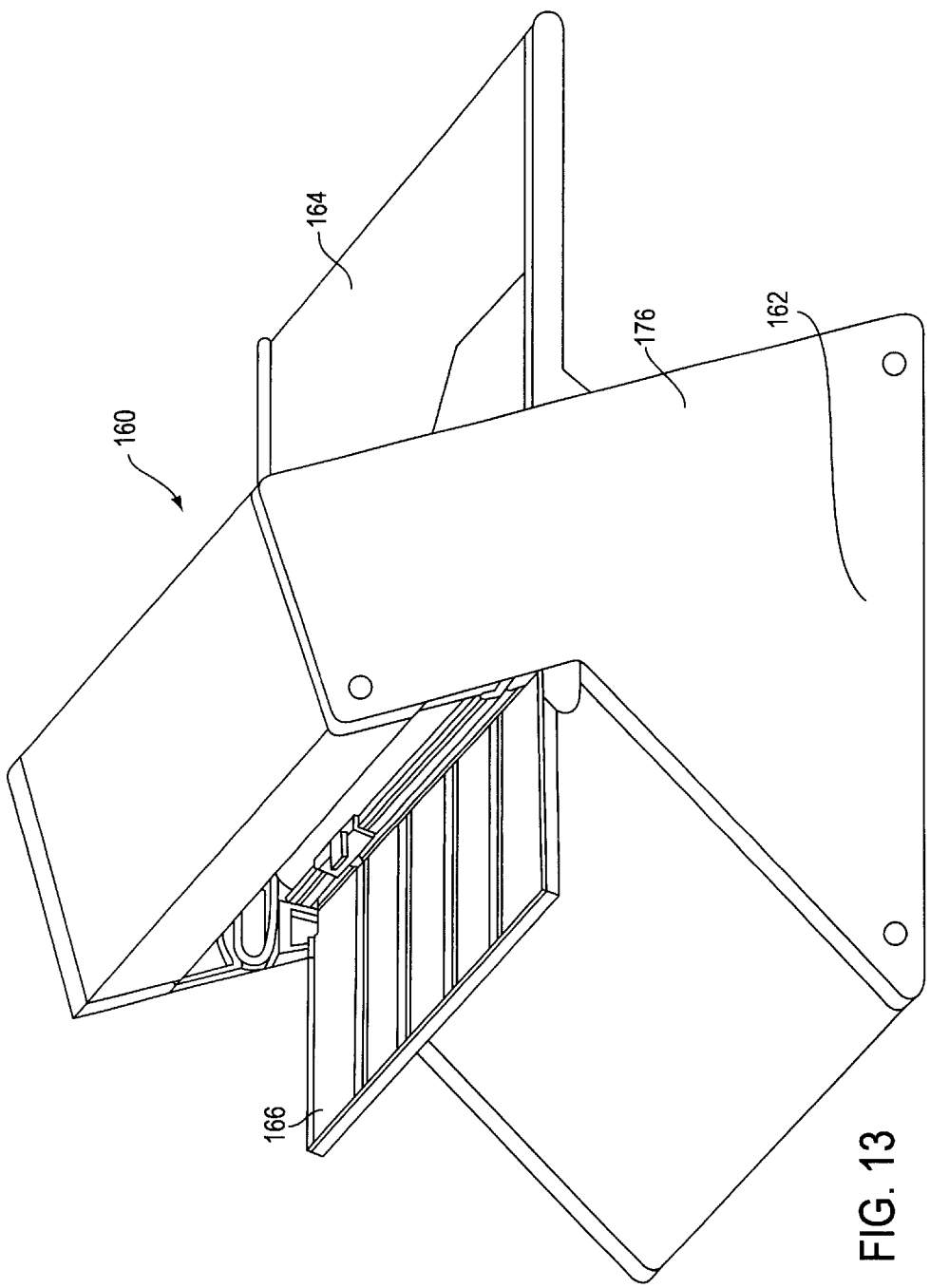
FIG. 13 is a perspective view of an adhesive transfer machine with which the adhesive transfer cartridge of FIG. 8 may be used.
Figure 14:
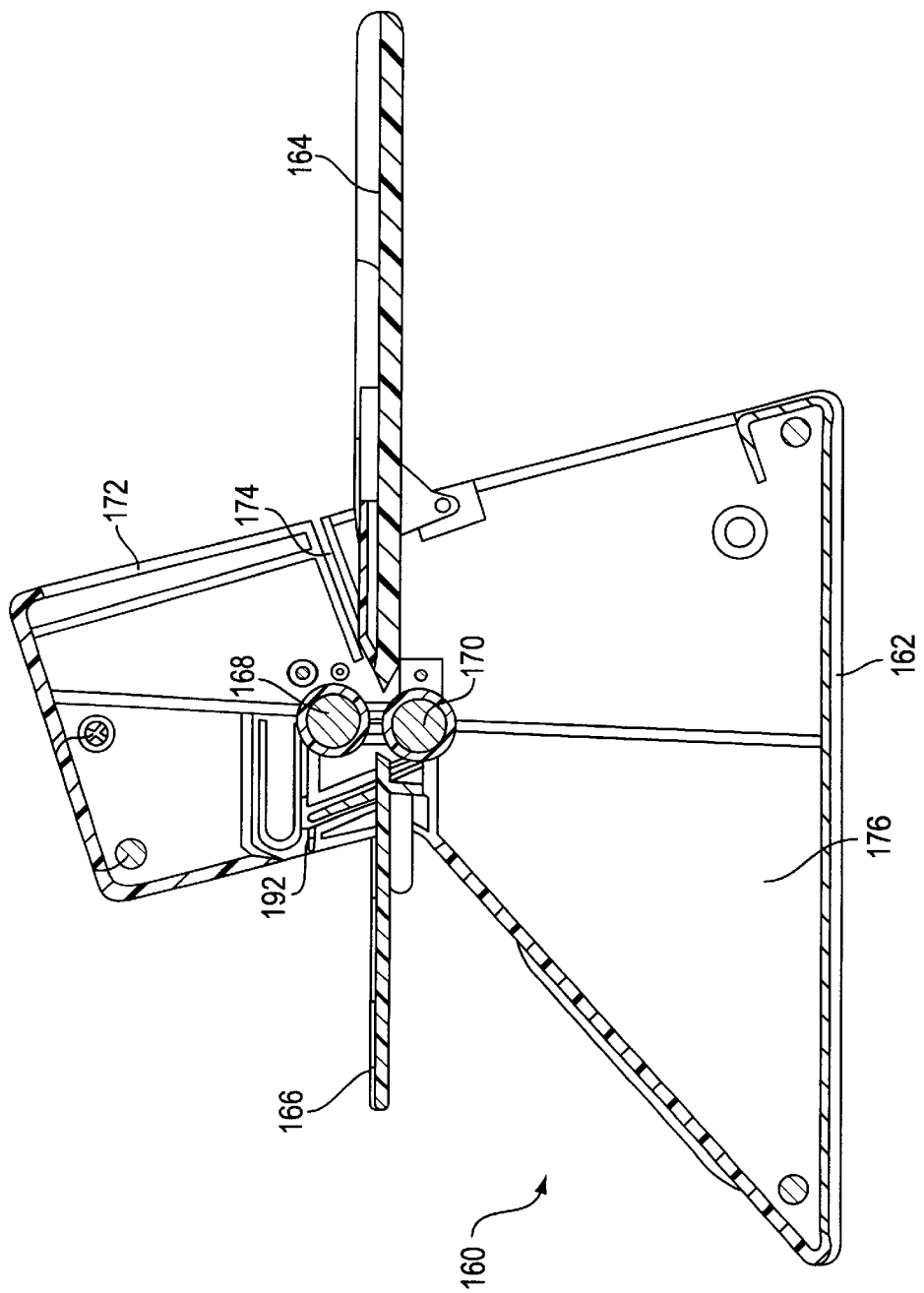
FIG. 14 is a cross-sectional view of the machine shown in FIG. 13.

FIG. 12 illustrates a perspective view of a laminating and adhesive transfer apparatus, generally indicated at 160, with which the removable cartridge 110 of the present invention may be used. It is to be understood that the removable cartridge 110 may be used with any type of adhesive transfer device and its use is not limited to the examples mentioned or discussed in the present application. The apparatus 160 comprises a frame 162, a feed tray 164, and an exit tray 166. As best seen in the cross-sectional view of FIG. 13, the apparatus 160 also comprises a pair of nip rollers 168, 170 and a cartridge-receiving opening 172. An elongated cartridge guiding slot 174 extends inwardly along each sidewall 176 of the frame structure 162 from the cartridge-receiving opening 172.

As can be appreciated from FIG. 8, the cartridge body structure 112 has an elongated outwardly extending guiding member 178 disposed on each side wall 118, 120. The guiding members 178 are configured to be slidably received within the cartridge guiding slots 174 when the removable cartridge 110 is manually engaged and inserted into the cartridge-receiving opening 172. It is to be understood that other structures may be used to guide the cartridge 110 within the opening 172. In fact, it is contemplated that no such guiding member 178 is necessary at all and is simply preferable.

Figure 10:
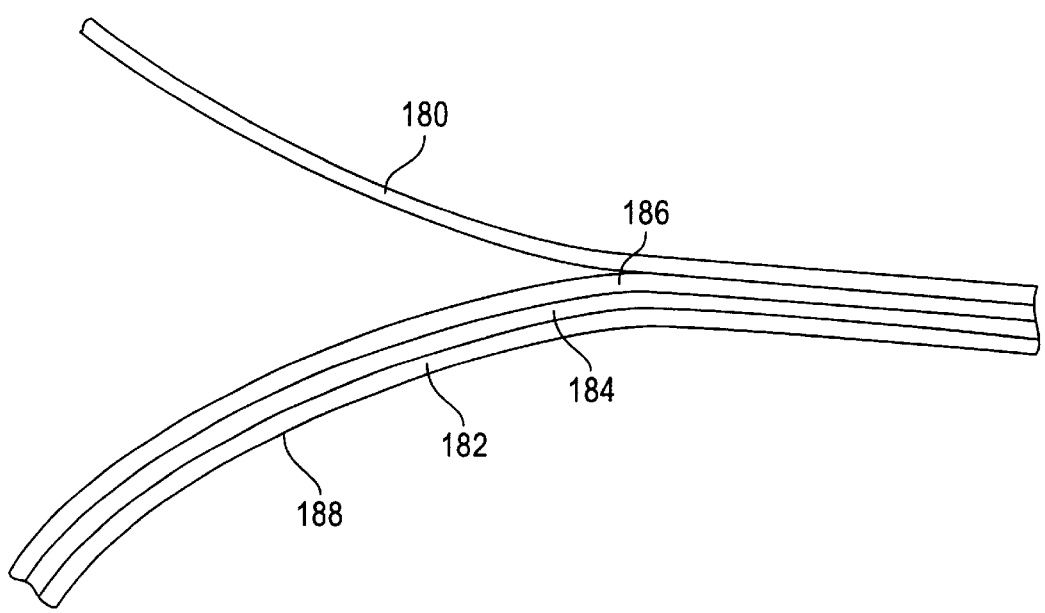
FIG. 10 is an enlarged and exaggerated view of the area indicated at A and outlined in phantom in FIG. 8.

FIG. 10 shows an enlarged view of the box indicated A in FIG. 8 and outlined in phantom. The scaling of the elements shown in FIG. 10 is exaggerated in order to more clearly illustrate the present invention. The upper supply roll 114 has a supply of adhesive mask material wound about a cylindrical core (not shown). The preferred adhesive mask material is a transparent plastic sheet 180. However, any type of material to which for adhesive materials will bond, such as paper, fabric, or various synthetic materials, may be used in place of the transparent plastic sheet 180. The lower supply roll 116 has a base substrate in the form of differential release liner 182 wound about a cylindrical core (not shown). The release liner 182 is coated with a layer of repositionable adhesive material 184. The layer of repositionable adhesive material 184 may be of any suitable type which does not permanently set when adhered to a contact surface. However, it is preferred to use a microsphere repositionable adhesive for layer 184.

A layer of permanent adhesive 186 covers the layer of repositionable adhesive 184. The permanent adhesive 184 is of the type that has relatively strong and durable bonding qualities suitable for extended periods of use. It is to be understood that such suitable materials may include an acrylic emulsion adhesive, a rubber-based adhesive, or any other suitable material exhibiting such qualities. Preferably, the permanent adhesive 186 is of the pressure-sensitive acrylic emulsion type and it will be noted that the operation discussed below is performed without the use of heat transfer.

The release liner 182 is preferably of the differential type. A differential release liner 182 has both opposing surfaces treated so as to prevent adhesive materials from bonding thereto. The release liner 182 is referred to as being differential because one side is treated more than the other such that the more treated side has relatively less affinity for adhesives than the less treated side. One way of treating the liner 182 is to coat the surfaces with silicone, although it is within the scope of the present invention to utilize other ways of treating the release liner 182. In the present subject matter, the more treated side 188 is the side which is not coated with the adhesive materials 184, 186. Thus, when the release liner 182, coated with both layers of adhesive material 184, 186 on one side, is wound on the cylindrical core of the supply roll 116, the permanent adhesive material 186 will not set and bond to the more treated side 188 of the radially inwardly adjacent portion of the release liner 182. The release liner 182 can then be easily unwound from the core when it is desired to perform an adhesive transfer operation.

Stated differently, when the release liner 182 is wound about the cylindrical core of the supply roll 114, 116 the layer of permanent adhesive material will be facing radially inwardly and the treated surface 188 of the release liner 182 will be facing radially outwardly. The portions of the layer of permanent adhesive 186 which are in contact with the treated surface 188 of the release liner 182 while wound on the core will not bond to the release liner 182 due to the fact that the treated surface 188 has a relatively poor affinity for adhesive materials. The basic requirement for the more treated surface 188 is that the bond between the more treated surface 188 and an adjacent permanent adhesive layer 186 must be relatively less than the bond between the repositionable adhesive layer 184 and the coated side of the release liner 182 so that the roll can unwind with the adhesive materials 184, 186 on the appropriate side.

The side of the release liner 182 on which the adhesive materials 184, 186 are coated is preferably treated similarly to surface 188, but to a lesser extent due to the differential nature of the liner 182. Because the nature of the repositionable adhesive layer 184 allows it to be removed and repositioned on another surface, the layer 184 will tend to stick to the permanent adhesive layer 186 rather than to the release liner 182 when the layer of permanent adhesive 186 is removed from the release liner 182. Thus, it is not necessary to treat the coated side of the release liner 182; however, it is preferable to do so in order to ensure that the layers of adhesive materials 184, 186 can be removed from the release liner 182 without generating any unwanted strain in the adhesive layers 184, 186. The basic requirement with respect to adhesive affinity for the coated side is that the bond between the layer of repositionable adhesive 184 and the layer of permanent adhesive 186 is stronger than the bond between the layer of repositionable adhesive 184 and the liner 182.

Figure 15:
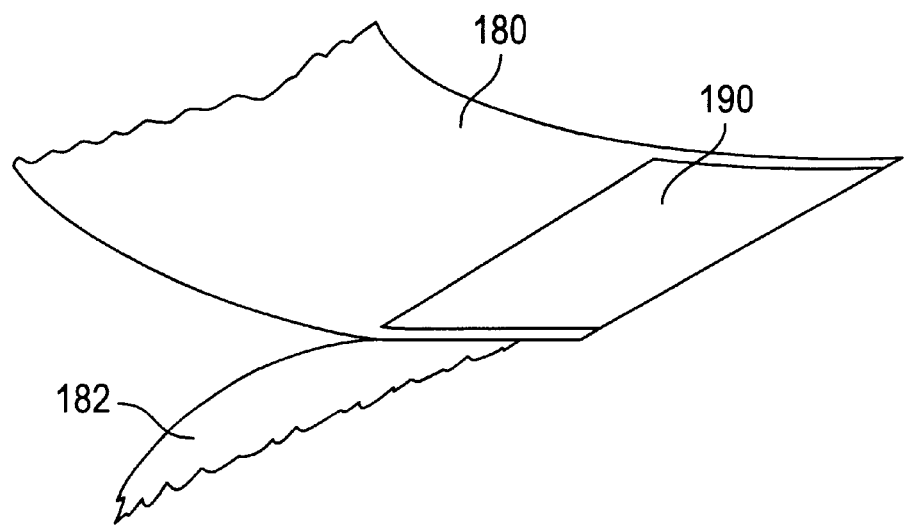
FIG. 15 is a perspective view of the ends of the release liner and the adhesive mask with a cartridge starter adhered therebetween.

As can be appreciated from FIG. 10, the materials from the supply rolls 114, 116 are disposed adjacent and in contact with one another before insertion into the nip rollers 168, 170 of the apparatus 160. The removable cartridge 110 is inserted into the cartridge-receiving opening of the apparatus 160 so that the feeding opening 128 faces outwardly with respect to the frame 162. In order to facilitate initially inserting the release liner 182 and adhesive mask 180 into the nip rollers 168, 170 a cartridge starter, such as the one disclosed in U.S. patent application of Ensign, Jr., Ser. No. 09/182,197, the entirety of which is incorporated into the present application by reference, may be used. Also, FIG. 15 illustrates a cartridge starter 190 which may also be initially used. The cartridge starter 190 is simply a piece of plastic, paper, or cardboard which is adhered to both the adhesive mask 180 and the permanent adhesive layer 186 on the release liner 182 before the initial use of the removable cartridge 110. The use of the cartridge starter 190 obviates the need for peeling the release liner 182 off of the lower supply rolls 116 in order to insert it between the nip rollers 168, 170 and reduces exposure of the user's hands and fingers to the sticky adhesives 184, 186. Also, the use of either cartridge starter will help ensure that the release liner 182 and adhesive mask 180 are properly aligned before insertion into the nip roller 168, 170.

When the removable cartridge 110 is removably inserted into the cartridge-receiving opening 172 of the apparatus, an adhesive transfer operation may then be performed on the selected substrate (not shown). The substrate may be any type of substrate which an user desires to repositionably adhere to a contact surface. For example, it may be desirable to perform an adhesive transfer operation on a business card, photograph, pieces in a school project, pieces of an arts and crafts project, etc.

The adhesive transfer process utilizing the removable cartridge 110 of the present invention is basically the same as the processes described in the above-incorporated '417 patent, the '962 patent, or the '629 application. The selected substrate is inserted into the feeding opening 128 of the cartridge 110 so as to pass between the upper and lower supply rolls 114, 116. The layer of permanent adhesive 186 on the release liner 182 is brought into contact with the surface of the substrate which is to carry the adhesives. The adhesive mask 180 contacts the opposing surface of the selected substrate. Together the release liner 182, the adhesive mask 180, and the selected substrate are fed into the nip rollers 168, 170 of the apparatus. The nip rollers 168, 170 apply pressure to these materials so that portions of the layer of permanent adhesive 186 are adequately adhered to the substrate. The selected substrate, along with the release liner 182 and adhesive mask 180 on the opposing sides thereof, is then discharged out the discharge side of the nip rollers 168, 170. A cutting device 192 located at the discharge side of side of the nip rollers 168, 170 can then be used to sever the substrate, liner 182 and mask 180.

After the selected substrate, liner 182, and mask 180 have been severed, the adhesive mask 180 may be then peeled back to expose the substrate and the portions of the release liner 182 not covered by the substrate. Due to the mask's 180 affinity for adhesive bonding, the portions of permanent adhesive material 186 not covered by the selected substrate will stick to the mask 180 and be stripped away from the release liner 182. The portions of the layer of repositionable 184 not covered by the substrate will also remain bonded to the permanent adhesive 186 and be stripped away from the release liner 182 along with the adhesive mask 180. The mask 180 can then be discarded along with the stripped adhesive materials 184, 186 adhered thereto. All that remains at this stage of the operation is the selected substrate and the release liner 182 along with the portions of adhesive material 184, 186 covered by the selected substrate disposed therebetween. The user then removes the selected substrate from the release liner 182. The portion of the layer of permanent adhesive 186 covered by the substrate, along with the portion of the layer of repositionable adhesive 184 covered by the substrate, will remain bonded to the surface of the selected substrate.

The finished product has a layer of permanent adhesive material bonded directly to its back and a layer of repositionable adhesive material bonded to the layer of permanent adhesive material. This arrangement of adhesive materials allows the substrate to be repositionably adhered to any desired contact surface and at a later time be removed from the contact surface and repositionably adhered on a different contact surface. Because the repositionable adhesive material is bonded to the substrate by virtue of a layer of a permanent adhesive material, the repositionable adhesive material will remain bonded to the selected substrate during repositioning rather than being left behind on a contact surface.

As can be seen from the above description, the use of the removable adhesive transfer cartridge of the present invention in conjunction with an adhesive transfer apparatus is an easier and simpler operation than manually applying liquid adhesives to the back of a master using either a brush or a spray bottle. Also, performing an adhesive transfer operation using the cartridge 110 of the present invention avoids the potential spillages which oftentimes occur while using liquid adhesives. In fact, the use of the adhesive mask 180 allows the operator to simply crumple it up and discard it after it has been removed from the release liner 182, thereby virtually eliminating manual contact with the adhesive materials 184, 186. Thus, the use of the cartridge of the present invention offers a cleaner and simpler method of making repositionable substrates in comparison to the ways heretofore known.

Figure 16:
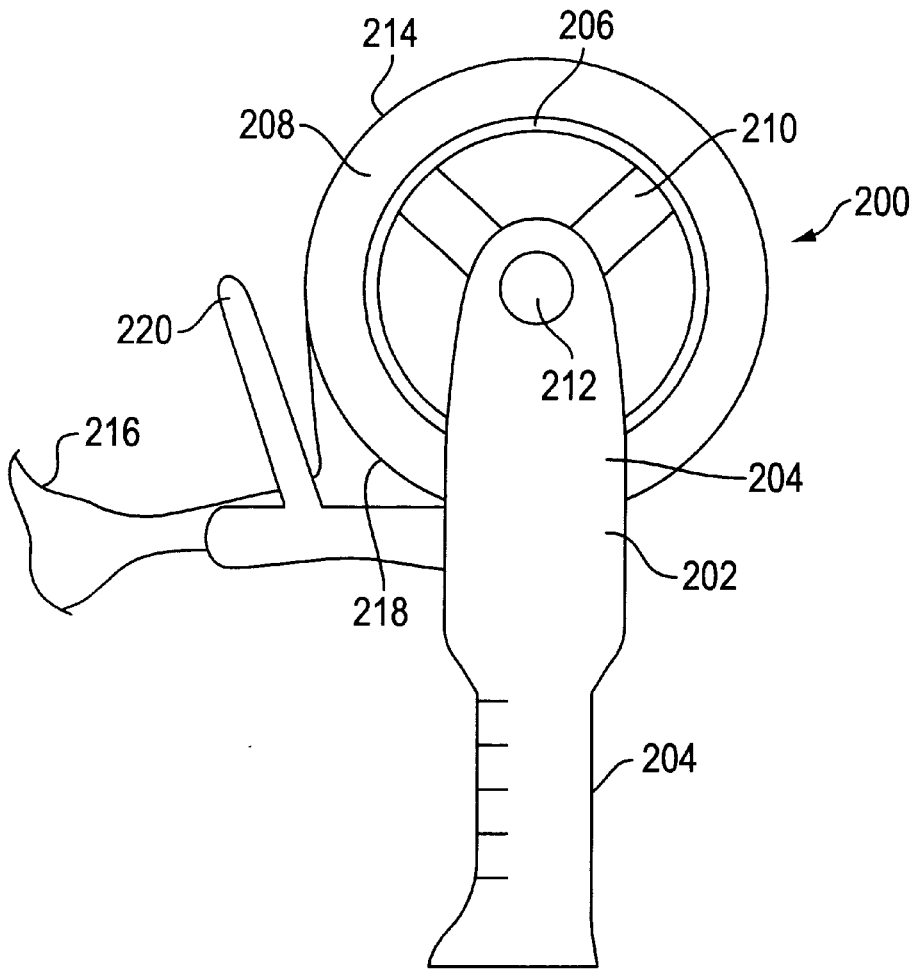
FIG. 16 is a profile view of an adhesive transfer device in the form of a substrate dispenser.

FIG. 16 illustrates yet another embodiment of the present invention. The adhesive transfer device 200 of FIG. 16 has a construction similar to a conventional packing tape dispenser. The device 200 comprises a frame 202 with a manually engageable handle portion 204. The frame 202 has a pair of spaced apart side walls 204. A generally cylindrical core 206 is rotatably mounted between the side walls 204. The core 204 is fit in a sleeve-like manner over radially extending mounting structures 210 and the mounting structure is rotatably secured to the frame 202 by a pair of threaded hubs 212.

A base substrate 208 similar to the ones used in the above-described embodiments is of the differential release-type has a release surface 214 on one side thereof. As in the embodiments described above, base substrate 208 is coated with a layer of repositionable adhesive and a layer of permanent adhesive. The details of the adhesive layers and their arrangement have been previously described and this will not be repeated for brevity's sake. The substrate 208 is wound about the core 206 such that the release surface 214 faces generally radially outwardly with respect to the core 206 and the permanent adhesive layer faces radially inwardly with respect to said core 206 so that the permanent adhesive layer is removably engaged with the release surface 214.

The nature of the release surface 214 is such that the free end portion 216 of the base substrate 208 can be unrolled from the base substrate and moved away from the release surface 214 of a radially inwardly adjacent portion 218 of the base substrate 208 leaving the adhesive layers on the free portion 216 with the permanent adhesive layer exposed. The user then adhesively bonds the permanent adhesive layer carried by the free end portion 216 by engaging the layer with the selected substrate and applying pressure to the substrate 208 sufficient to affect adhesive bonding. The pressure may be applied directly by the user's hand or by engaging a flexible wiper portion 220 of the device 200 with the base substrate 208.

The user then moves the frame 202 relative to the selected substrate so as to dispense a length of the base substrate 208 along a corresponding portion of the selected substrate. The portion of the permanent adhesive layer along the unrolled length of the base substrate 208 engages the corresponding portion of the selected substrate and is adhesively bonded to the corresponding selected substrate portion by applying pressure to the base substrate 208 sufficient to affect adhesive bonding. The pressure may be applied by hand or by the wiper 220 as the device 200 is moved.

Then the unrolled length of base substrate 208 can be severed. The severing may be performed by a knife or scissors, a blade (not shown) as is conventionally provided on packing tape dispensers, or by manually tearing the base substrate 208. The base substrate 208 can thereafter be moved away from the selected substrate leaving the adhesive layers on the selected substrate with the repositionable adhesive layer exposed. This type of device 200 is especially useful for creating large repositionable window signs.

In all of the above-described embodiments, it is preferred that the nature and thickness of the permanent adhesive layer be such that the permanent adhesive layer can be securely adhesively bonded to textured surfaces, such as cloth or carpeting. Preferably, the weight ratio of repositionable adhesive to permanent adhesive is at least 1:1. When using adhesive layers which are bonded directly to one another with no intervening layer therebetween, remaining above this threshold ratio ensures that the permanent and repositionable adhesives will not mix with one another to a point where the permanent adhesive overcomes the repositionable adhesive and creates a mixed layer with permanent bonding characteristics. When using this direct bonding arrangement and remaining over the lower weight ratio threshold, it has been found that the permanent adhesive layer will bond to textured surfaces when the combined adhesive layers have a density of greater than 20 grams per square meter. The permanent adhesive layer's bonding capability will increase as the combined density is increased. It has been found that a density over 25 grams per square meter is preferable and approximately 27 grams per square meter is optimal when using a microsphere adhesive for the repositionable adhesive layers and an acrylic emulsion based permanent adhesive. A density of 27 grams per square meter is preferred because it has the optimal balance between secure bonding and cost-effectiveness.

It will be thus appreciated that the objectives of the present invention have been fully and effectively accomplished. The foregoing detailed embodiments have been provided to illustrate the functional and structural principles of the present invention and are not intended to be limiting. The contrary, the present invention is intended to cover all modifications, alterations, and substitutions within the spirit and scope of the appended claims.

What is claimed is:

1. A method for making a repositionably adherable substrate from a selected substrate and repositionably adhering the repositionably adherable substrate to a contact surface, said method comprising:

selecting the selected substrate to be made into said repositionably adherable substrate as desired by the user;

providing an adhesive transfer device comprising:
a base substrate;
a layer of repositionable adhesive provided on said base substrate;
a layer of permanent adhesive provided adjacent to said repositionable adhesive layer opposite the base substrate; and
structure providing a release surface, said release surface being removably engaged with said permanent adhesive layer opposite said repositionable adhesive layer and said base substrate so as to cover said permanent adhesive layer;
the nature of said release surface being such that said base substrate and the structure providing said release surface can be moved apart from one another so as to separate said release surface from said permanent adhesive layer and leave both of said adhesive layers on said base substrate with said permanent adhesive layer exposed;
said adhesive layers being provided such that, after an exposed portion of said permanent adhesive layer has been adhesively bonded to the selected substrate, said base substrate and the selected substrate can be moved apart from one another so as to separate said base substrate from said repositionable adhesive layer and leave both said adhesive layers on the selected substrate with said repositionable adhesive layer exposed;

moving said release surface apart from said adhesive layers so as to leave both said adhesive layers on said base substrate with said permanent adhesive layer exposed;

engaging said exposed permanent adhesive layer with said selected substrate as desired by the user so as to adhesively bond said exposed permanent adhesive layer with said selected substrate;

moving said base substrate and said selected substrate relatively apart from one another so as to leave portions of both adhesive layers on said selected substrate with said repositionable adhesive layer exposed and separate said base substrate from said portions of both adhesive layers;

selecting a contact surface entirely separate from said selected substrate as desired by the user;

engaging the exposed repositionable adhesive layer on said selected substrate with said contact surface so as to repositionably adhere said selected substrate to said contact surface with the repositionable adhesive layer, thereby enabling the user to remove the selected substrate from the contact surface and repositionably adhere the selected substrate with another contact surface also entirely separate from the contact surface or the same contact surface as desired by the user.

2. A method according to claim 1, wherein the nature and thickness of said permanent adhesive layer is such that said permanent adhesive layer can be securely adhesively bonded to a selected substrate having a textured surface.

3. A method according to claim 1, wherein said adhesive layers are bonded directly to one another with no intervening layers therebetween and wherein a weight ratio of the weight of said repositionable adhesive layer to the weight of said permanent adhesive layer is greater than 1:1.

4. A method according to claim 2, wherein said adhesive layers have a combined density greater than 20 grams per square meter.

5. A method according to claim 3, wherein said repositionable adhesive is an acrylic microsphere adhesive.

6. A method according to claim 4, wherein the combined density of said adhesive layers is greater than 25 grams per square meter.

7. A method according to claim 5, wherein the combined density of said adhesive layers is approximately 27 grams per square meter.

8. A method according to claim 1, wherein said permanent adhesive is an acrylic-based emulsion.

9. A method according to claim 1, wherein said repositionable adhesive is an acrylic microsphere adhesive.

10. A method according to claim 1, wherein said structure defining said release surface is a release liner substrate, said release liner substrate, said base substrate and said adhesive layers being arranged in substantially flat parallel relation to define an adhesive transfer sheet;

wherein moving said release surface apart from said adhesive layers so as to leave both said adhesive layers on said base substrate with said permanent adhesive layer exposed is performed by moving said release liner apart from said adhesive layers and said base substrate.

11. A method according to claim 9, wherein said adhesive transfer device further comprises an adhesive mask substrate positioned adjacent said release liner substrate opposite said adhesive layers, the nature of said adhesive mask substrate being such that, after the release liner substrate has been moved apart from said base substrate so as to separate said release surface from said permanent adhesive layer and the selected substrate has been adhesively bonded to said permanent adhesive layer but before the selected substrate has been moved apart from said base substrate so as to separate said base substrate from said repositionable adhesive layer, said adhesive mask substrate can be positioned in covering relation over the selected substrate with a portion of the adhesive mask substrate engaging the selected substrate and a portion of the adhesive substrate mask engaging peripheral portions of the permanent adhesive layer that are exposed around the periphery of the selected substrate so that the peripheral portions of said permanent adhesive layer are bonded to said adhesive substrate mask in such a manner that said adhesive substrate mask can thereafter be moved away from said base substrate and the selected substrate so as to remove the peripheral portions of the permanent adhesive layer and corresponding peripheral portions of said repositionable adhesive layer from said base substrate, thereby leaving the selected substrate on said base substrate with portions of the permanent and repositionable adhesive layers disposed therebetween and substantially no adhesive disposed on said base substrate around the periphery of the selected substrate;

said method further comprising:

after the release liner substrate has been moved apart from said base substrate so as to separate said release surface from said permanent adhesive layer and the selected substrate has been adhesively bonded to said permanent adhesive layer but before the selected substrate has been moved apart from said base substrate so as to separate said base substrate from said repositionable adhesive layer, positioning said adhesive mask substrate in covering relation over the selected substrate with a portion of the adhesive mask substrate engaging the selected substrate and a portion of the adhesive mask substrate engaging peripheral portions of the permanent adhesive layer that are exposed around the periphery of the selected substrate so that the peripheral portions of said permanent adhesive layer are bonded to said adhesive mask substrate;

then moving said adhesive mask substrate relatively away from said base substrate and the selected substrate so as to remove the peripheral portions of the permanent adhesive layer and corresponding peripheral portions of said repositionable adhesive layer from said base substrate, thereby leaving the selected substrate on said base substrate with portions of the permanent and repositionable adhesive layers disposed therebetween and substantially no adhesive disposed on said base substrate around the periphery of the selected substrate.

12. A method according to claim 9, wherein said release liner substrate has a stripping surface opposite said release surface with a higher affinity for adhesive bonding than said release surface, the nature of said stripping surface being such that, after the release liner substrate has been moved apart from said base substrate so as to separate said release surface from said permanent adhesive layer and the selected substrate has been adhesively bonded to said permanent adhesive layer but before the selected substrate has been moved apart from said base substrate so as to separate said base substrate from said repositionable adhesive layer, said release liner substrate can be reoriented and positioned in covering relation over the selected substrate with a portion of the stripping surface engaging the selected substrate and a portion of the stripping surface engaging peripheral portions of the permanent adhesive layer that are exposed around the periphery of the selected substrate so that the peripheral portions of said permanent adhesive layer are bonded to said stripping surface;

said method further comprising:

after the release liner substrate has been moved apart from said base substrate so as to separate said release surface from said permanent adhesive layer and the selected substrate has been adhesively bonded to said permanent adhesive layer but before the selected substrate has been moved apart from said base substrate so as to separate said base substrate from said repositionable adhesive layer, reorienting said release liner substrate and positioning said release liner in covering relation over the selected substrate with a portion of the stripping surface engaging the selected substrate and a portion of the stripping surface engaging peripheral portions of the permanent adhesive layer that are exposed around the periphery of the selected substrate so that the peripheral portions of said permanent adhesive layer are bonded to said stripping surface;

then moving said release liner away from said base substrate and the selected substrate so as to remove the peripheral portions of the permanent adhesive layer and corresponding peripheral portions of said repositionable adhesive layer from said base substrate, thereby leaving the selected substrate on said base substrate with portions of the permanent and repositionable adhesive layers disposed therebetween and substantially no adhesive disposed on said base substrate around the periphery of the selected substrate.

13. A method according to claim 9, wherein said adhesive transfer device further comprises a plurality of said adhesive transfer sheets bound together.

14. A method according to claim 12, wherein each of said adhesive transfer sheets is generally rectangular.

15. A method according to claim 1, wherein said adhesive transfer device further comprises a core and wherein the structure defining said release surface is a surface of said base substrate opposite said adhesive layers, said base substrate being wound about said core such that said release surface faces generally in a first radial direction with respect to said core and said adhesive layers face generally in a second radial direction with respect to said core opposite said first radial direction with said permanent adhesive layer removably engaging said release surface, wherein moving said release surface apart from said adhesive layers so as to leave both said adhesive layers on said base substrate with said permanent adhesive layers exposed is performed by unwinding said base substrate and to separate said release surface and said permanent adhesive layer with both said adhesive layers remaining on said base substrate with said permanent adhesive layer exposed.

16. A method according to claim 14, wherein said adhesive transfer device further comprises a frame constructed and arranged to be manually handled, said core being rotatably mounted to said frame such that a user can unroll said base substrate and apply the adhesive layers to the selected substrate;

said method further comprising:

after engaging the exposed permanent adhesive layer with the selected substrate and adhesively bonding said permanent adhesive layer to the selected substrate, moving said frame relative to the selected substrate so as to cause additional portions of said base substrate to unroll from said core whereby the permanent adhesive layer on said additional portions becomes exposed and thereafter engaged with and adhesively bonded to the selected substrate.

17. A method according to claim 15, wherein said adhesive transfer device further comprises a pressure applying element mounted to said frame, said pressure applying element being constructed and arranged to apply pressure to the base substrate as the base substrate and the permanent adhesive layer associated therewith is being adhesively bonded to the selected substrate.

18. An adhesive transfer device according to claim 14, wherein unwinding said base substrate is performed by unwinding a free end portion of said base substrate and moving said free end portion away from the release surface.

19. A method according to claim 17, wherein said adhesive transfer device further comprises a frame constructed and arranged to be manually handled, said core being rotatably mounted to said frame such that a user can unroll the free end portion of said base substrate and apply the adhesive layers to the selected substrate;

said method further comprising:

after engaging the exposed permanent adhesive layer with the selected substrate and adhesively bonding said permanent adhesive layer to the selected substrate, moving said frame relative to the selected substrate so as to dispense a length of said base substrate along a corresponding portion of the selected substrate and adhesively bonding the exposed permanent adhesive layer associated with the dispensed length to the corresponding portion of the selected substrate, and thereafter moving the dispensed length of said base substrate away from the selected substrate so as to separate the dispensed length of said base substrate from the layer of repositionable adhesive and leaving both said adhesive layers on the selected substrate with said repositionable adhesive layer exposed.

20. A method according to claim 18, wherein said adhesive transfer device further comprises a pressure applying element mounted to said frame, said pressure applying element being constructed and arranged to apply pressure to the base substrate as the base substrate is being dispensed from said device and the permanent adhesive layer associated therewith is being adhesively bonded to the selected substrate.

21. A method according to claim 1, wherein said adhesive transfer device is to be used in conjunction with an adhesive transfer apparatus comprising a frame and a pair of cooperating structures mounted to the frame, said device further comprising: a cartridge body constructed and arranged to be removably mounted to the apparatus frame; a pair of cores rotatably mounted to said cartridge body; said release surface being provided by a surface of said base substrate opposite said adhesive layers, said base substrate being wound about a first of said cores such that said release surface faces generally in a first radial direction with respect to said first core and said adhesive layers face generally in a second radial direction with respect to said first core with said permanent adhesive layer removably engaging said release surface, the nature of said release surface being such that a free end portion of said base substrate can be unrolled and moved away from the release surface so as to separate said permanent adhesive layer from the release surface of the of said base substrate and leave both of said adhesive layers on the free end portion of said base substrate with said permanent adhesive layer exposed, thereby enabling the free end portion to be fed between the cooperating structures of said apparatus; and an adhesive mask substrate wound about a second of said cores, said adhesive mask substrate having a higher affinity for adhesive bonding than said release surface;

said method further comprising:

removably mounting said cartridge body to the apparatus frame, feeding the selected substrate between the cooperating structures with the base substrate unrolled from said first core and disposed on one side of the selected substrate and the permanent adhesive layer thereof facing the selected substrate and the adhesive mask substrate unrolled and disposed on the other side of the selected substrate;

advancing the base substrate, the mask substrate, and the selected substrate together between the cooperating structure so as to perform an adhesive transfer process wherein the cooperating structures cooperate to apply pressure to said substrates to adhesively bond a portion of the permanent adhesive layer to the selected substrate and a peripheral portion of said permanent adhesive layer extending around the periphery of the selected substrate to said adhesive mask substrate and then discharge the processed substrates outwardly therefrom, then moving said adhesive mask substrate away from said base substrate and the selected substrate so as to remove the peripheral portions of the permanent adhesive layer and corresponding peripheral portions of said repositionable adhesive layer from said base substrate, thereby leaving the selected substrate on said base substrate with portions of the permanent and repositionable adhesive layers disposed therebetween and substantially no adhesive disposed on said base substrate around the periphery of the selected substrate.

22. A method according to claim 1, wherein selecting said selected substrate is performed by selecting one of a business card, a window sign, a photograph, and a chart.

\* \* \* \* \*